US007060943B2

(12) United States Patent
Hwang

(10) Patent No.: US 7,060,943 B2
(45) Date of Patent: Jun. 13, 2006

(54) COOKING APPARATUS HAVING HEATERS

(75) Inventor: Yun-Ic Hwang, Suwon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 705 days.

(21) Appl. No.: 10/279,881

(22) Filed: Oct. 25, 2002

(65) Prior Publication Data

US 2004/0035862 A1 Feb. 26, 2004

(30) Foreign Application Priority Data

Aug. 20, 2002 (KR) .............................. 2002-49329

(51) Int. Cl.
*H05B 1/02* (2006.01)
*A21B 1/40* (2006.01)
*F27D 19/00* (2006.01)

(52) U.S. Cl. ...................... 219/414; 219/395; 219/489; 219/492

(58) Field of Classification Search .................... None
See application file for complete search history.

(56) References Cited

U.S. PATENT DOCUMENTS

| | | | | |
|---|---|---|---|---|
| 4,309,584 | A * | 1/1982 | Terakami | 219/720 |
| 4,345,145 | A * | 8/1982 | Norwood | 219/492 |
| 5,171,974 | A * | 12/1992 | Koether et al. | 219/506 |
| 5,398,597 | A * | 3/1995 | Jones et al. | 99/330 |
| 5,793,023 | A | 8/1998 | Hong et al. | |
| 5,808,278 | A * | 9/1998 | Moon et al. | 219/506 |
| 5,968,402 | A | 10/1999 | Lee | |
| 6,080,972 | A * | 6/2000 | May | 219/494 |
| 6,097,016 | A * | 8/2000 | Hirata et al. | 219/720 |
| 6,157,002 | A * | 12/2000 | Schjerven et al. | 219/388 |
| 6,232,584 | B1 | 5/2001 | Meyer | |
| 6,381,518 | B1 | 4/2002 | Huffington et al. | |
| 6,388,235 | B1 * | 5/2002 | Sauter et al. | 219/400 |
| 6,750,433 | B1 * | 6/2004 | Guenther et al. | 219/506 |
| 6,812,433 | B1 * | 11/2004 | Barritt | 219/413 |
| 6,852,960 | B1 * | 2/2005 | Chun | 219/720 |
| 6,933,477 | B1 * | 8/2005 | Becker et al. | 219/506 |

FOREIGN PATENT DOCUMENTS

JP 06090864 A * 4/1994

OTHER PUBLICATIONS

U.S. Appl. No. 10/279,889, filed Oct. 25, 2002, Yun-Ic Hwang.
U.S. Appl. No. 10/279,880, filed Oct. 25, 2002, Yun-Ic Hwang.
U.S. Appl. No. 10/279,879, filed Oct. 25, 2002, Yun-Ic Hwang.

* cited by examiner

*Primary Examiner*—Joseph Pelham
(74) *Attorney, Agent, or Firm*—Staas & Halsey LLP

(57) ABSTRACT

A cooking apparatus having heaters and a cooking chamber defined in the cooking apparatus, the heaters are provided in the cooking chamber, and two or more buttons are provided representing different cooking temperatures. A temperature of the cooking chamber is set by pushing one of the two or more buttons. One of a plurality of cooking modes is selected depending on a kind of food, and each of the cooking temperatures is represented by one of the two or more buttons corresponds to each of the cooking modes. Therefore, setting various cooking temperatures depending on the kind of food is possible.

13 Claims, 6 Drawing Sheets

COOKING APPARATUS HAVING HEATERS

CROSS-REFERENCE TO RELATED APPLICATION

This application claims the benefit of Korean Application No. 2002-49329, filed Aug. 20, 2002, in the Korean Intellectual Property Office, the disclosure of which is incorporated herein by reference.

BACKGROUND OF THE INVENTION

1. Field of the Invention

The present invention relates to a cooking apparatus, and more particularly, to a cooking apparatus having heaters.

2. Description of the Related Art

In general, a microwave oven is used to heat food by electromagnetic waves generated from a magnetron. Where the microwave oven is equipped with an additional heater, the microwave oven can further fulfill various cooking modes such as a baking function and a broiling function.

SUMMARY OF THE INVENTION

Accordingly, it is an aspect of the present invention to provide a cooking apparatus having heaters, which is provided with different setting buttons indicating representative set temperatures, so that a user can easily set a desired heating temperature to cook food by pushing one of the setting buttons is provided.

Additional aspects and advantages of the invention will be set forth in part in the description which follows and, in part, will be obvious from the description, or may be learned by practice of the invention.

In order to accomplish the above and other aspects, a cooking apparatus is provided comprising: a cooking chamber defined in the cooking apparatus; a heater provided in the cooking chamber; and two or more buttons representing different cooking temperatures; wherein a temperature of the cooking chamber is set by pushing one of the two or more buttons.

One of a plurality of cooking modes may be selected depending on a kind of food, and each of the cooking temperatures represented by the two or more buttons may correspond to each of the cooking modes.

The cooking apparatus may further include a keypad including numerical keys allocated with preset numeric characters, each of the numerical keys of the keypad representing a preset cooking temperature.

BRIEF DESCRIPTION OF THE DRAWINGS

These and other aspects and advantages of the invention will become apparent and more readily appreciated from the following description of the preferred embodiments, taken in conjunction with the accompanying drawings of which.

DESCRIPTION OF THE PREFERRED EMBODIMENTS

Figure 1A:
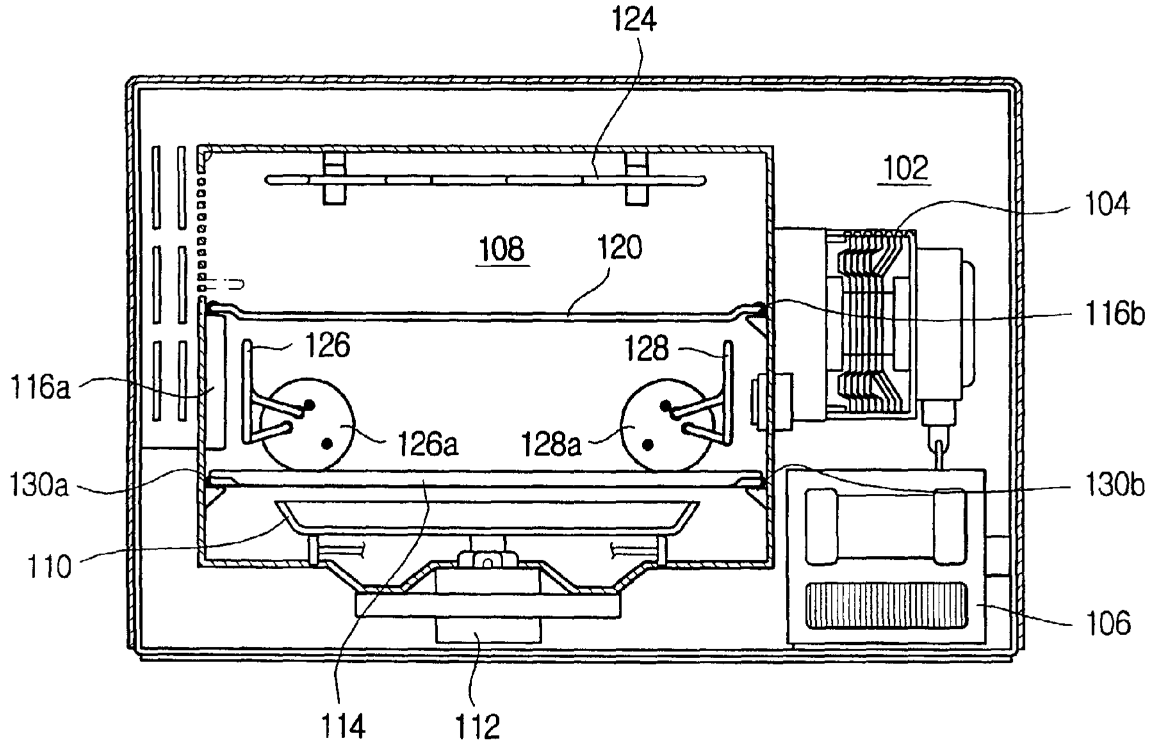
FIG. 1A is a cross-sectional view of a microwave oven having heaters.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1A shows a related microwave oven having a heater, invented by the same inventor as in the present invention, in which a door of the microwave is opened. As shown in FIG. 1A, an electric component compartment 102 is provided therein with a magnetron 104 to generate electromagnetic waves. The magnetron 104 is supplied with electric power of very high voltage from an electric power supply 106.

A cooking chamber 108 is provided at a bottom surface of the cooking chamber 108 with a glass tray 110, which is used during cooking as electromagnetic waves generated from the magnetron 104 cook the food. The glass tray 110 is rotated by a motor 112. The cooking chamber 108 is provided therein with an upper heater 124 and a pair of lower heaters 126 and 128. The upper heater 124 is mounted on a ceiling of the cooking chamber 108 to radiate heat toward an upper surface of the food. A grill 120 is disposed below the upper heater 124. The grill 120 is placed on grill supports 116*a* and 116*b* so as to be mainly used in broiling meats or fish. The pair of lower heaters 126 and 128 is disposed below the grill 120. Disposed below the pair of lower heaters 126 and 128 is a plate 114. The plate 114 is placed on plate supports 130*a* and 130*b* so as to be used in baking breads or biscuits.

The pair of lower heaters 126 and 128 is positioned between the grill 120 and the plate 114. In the case of cooking the food by the grill 120, the food, placed on the grill 120, is heated at a lower surface of the food. In the case of cooking the food by the plate 114, the food, placed on the plate 114, is heated at an upper surface of the food. The lower heaters 126 and 128 are coupled to rotating members 126*a* and 128*a*, respectively. Therefore, as the rotating members 126*a* and 128*a* are rotated, the pair of lower heaters 126 and 128 are rotated along with the rotating members 126*a* and 128*a*, respectively.

Figure 1B:
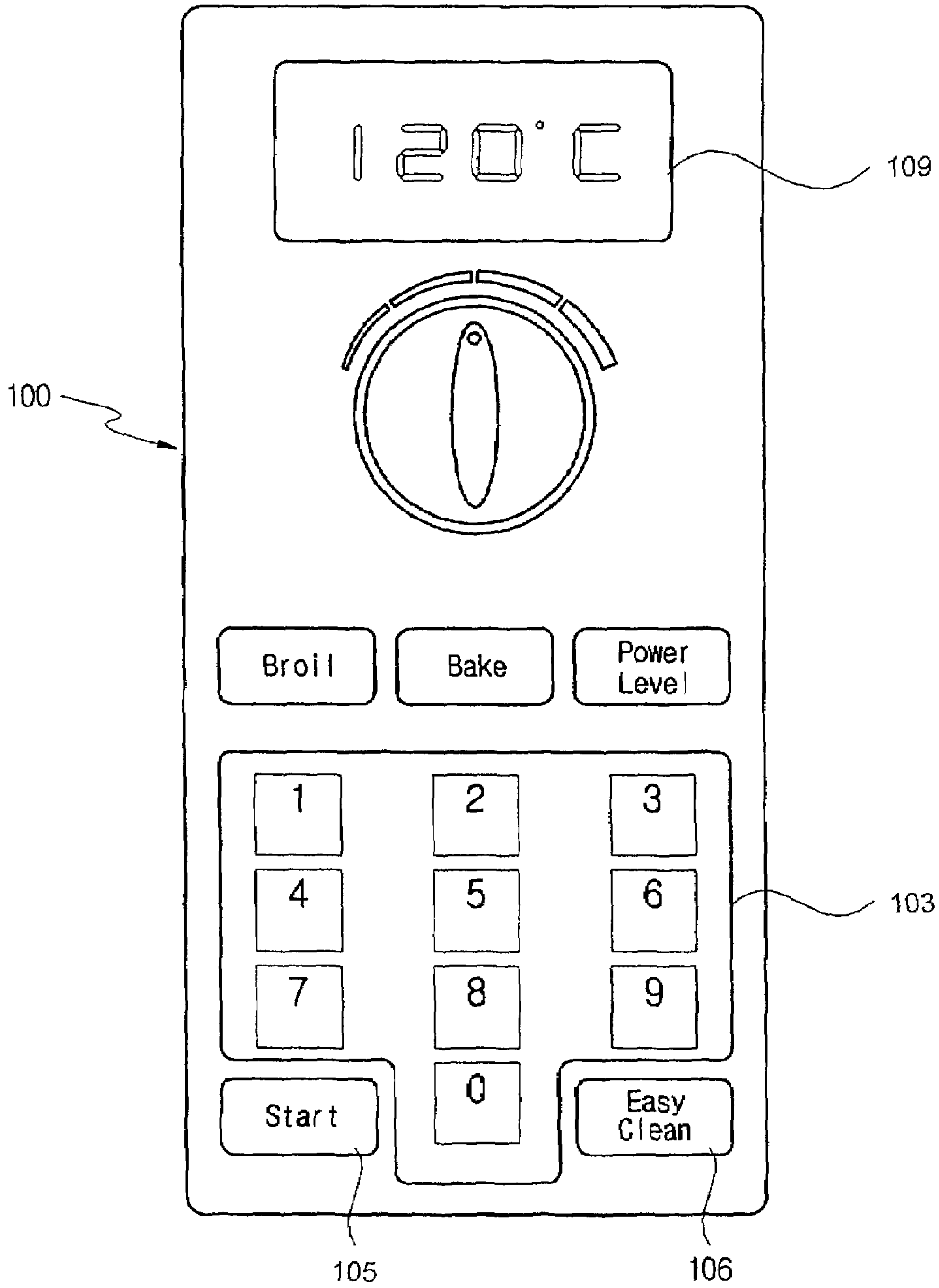
FIG. 1B is a view showing an input unit of the microwave oven shown in FIG. 1A.

In the above microwave oven, when there is a need to cook the food by the upper heater 124 and the pair of lower heaters 126 and 128, a heating temperature of each of the heaters may be differently set depending on the kind of food. The heating temperature of each of the heaters 124, 126 and 128 may be set through manipulation of a keypad 103 of an input unit 100. Further, the input unit includes an easy cleaning button 106 for setting a clean mode of the microwave oven, a start button 105 to start various operations of the microwave oven and a display 109 to display, for example, various temperature and time settings of the microwave oven. FIG. 1B shows the input unit 100 of the microwave oven in which the keypad 103 of the input unit 100 is provided with numerical keys, which indicate numeric characters "0"–"9", respectively. In order to set a desired heating temperature, the numerical keys corresponding to a numerical value of the desired heating temperature are pushed by a user. For example, in order to set a temperature of 120° C., the numerical keys corresponding to numeric characters "1", "2" and "0" may be sequentially manipulated.

This invention will be described in further detail by way of example with reference to FIGS. 2 to 4 of the accompanying drawings.

Figure 2:
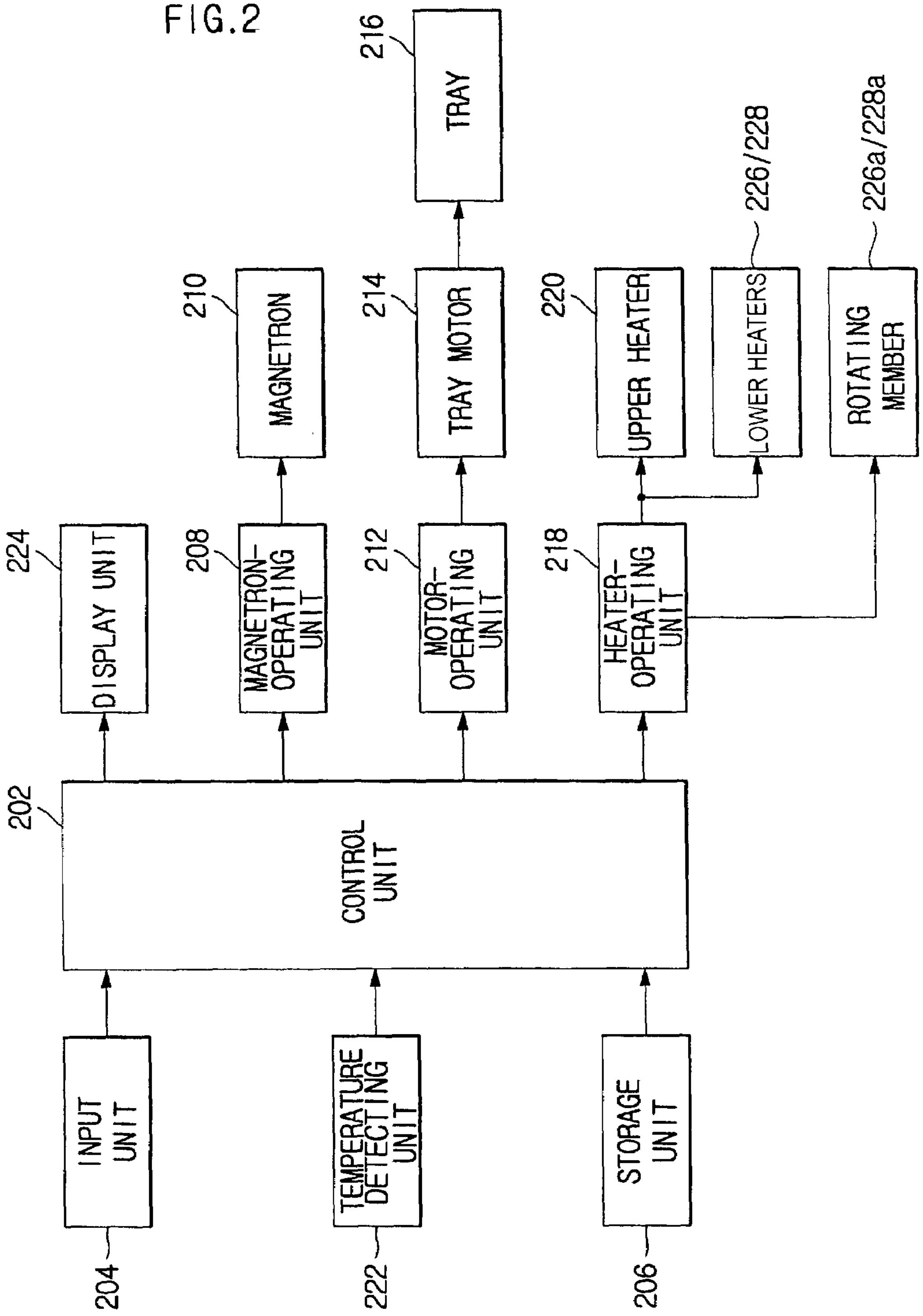
FIG. 2 is a block diagram showing a microwave oven having heaters according to an embodiment of the present invention.
Figure 5:
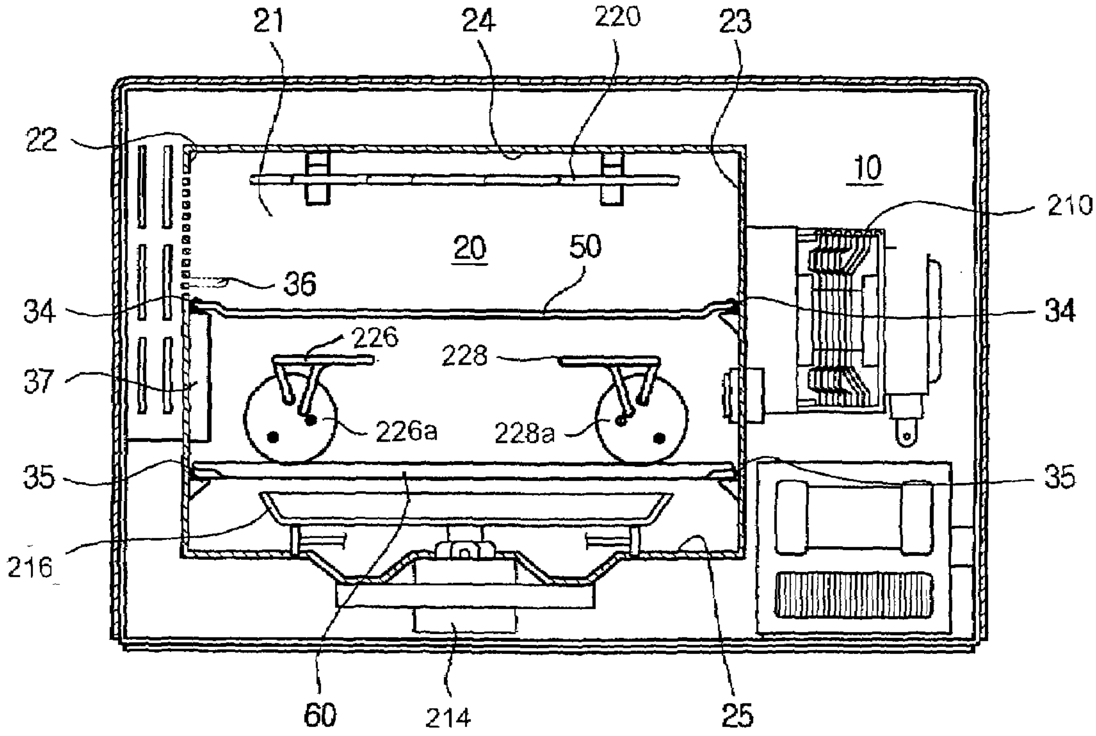
FIG. 5 is a microwave oven according to the embodiment of the present invention.

FIG. 2 is a block diagram showing a microwave oven having heaters according to an embodiment of the present invention. As shown in FIG. 2, the microwave oven includes a control unit 202 to control an overall operation of the microwave oven. The control unit 202 is connected to an input unit 204, a temperature-detecting unit 222 and a storage unit 206 at an input terminal of the control unit 202. The input unit 204 is provided with an easy clean button, as shown in FIG. 1B, as well as various keys such as numerical keys and mode selection keys, which allow a user to set a cooking mode and a time. The temperature-detecting unit 222 detects an inside temperature of a cooking chamber 20, as shown in FIG. 5, and sends a temperature value of the cooking chamber 20 to the control unit 202. The storage unit 206 stores data required to perform various cooking operations.

A magnetron-operating unit 208, a motor-operating unit 212 and a heater-operating unit 218 are connected to an output terminal of the control unit 202. The magnetron-operating unit 208 serves to drive a magnetron 210 to generate electromagnetic waves. The motor-operating unit 212 serves to drive a tray motor 214, thereby rotating a tray 216 disposed in a cooking chamber 20. The heater-operating unit 218 causes an upper heater 220 and lower heaters 226 and 228 to emit heat, in response to instructions of the control unit 202. In particular, the heater-operating unit 218 controls not only heating conditions of the lower heaters 226 and 228, but also rotating conditions of the lower heaters 226 and 228. More specifically, when the microwave oven is operated in a cooking mode, rotating members 226*a* and 228*a* associated with the lower heaters 226 and 228 respectively, are rotated toward each other to cause the lower heaters 226 and 228 to be extended toward a center of the cooking chamber 20. When the cooking mode is completed, the rotating members 226*a* and 228*a* are rotated in respective reverse directions to cause the lower heaters 226 and 228 to be returned to respective rest positions.

Figure 3:
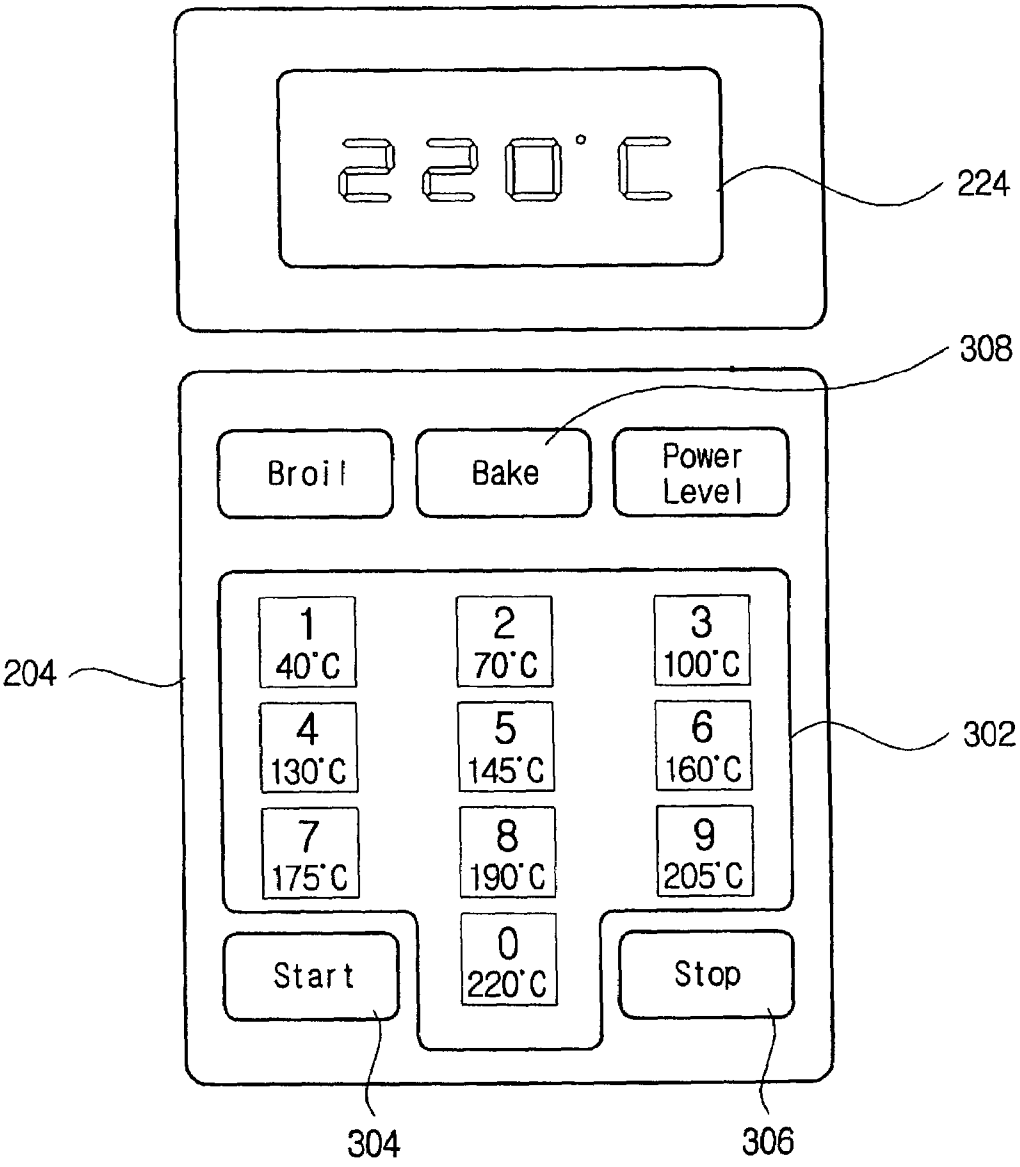
FIG. 3 is a view showing an input unit and a display unit of the microwave oven according to the embodiment of the present invention.

FIG. 3 shows an input unit of the microwave oven according to the embodiment of the present invention. As shown in FIG. 3, the input unit 204 of the microwave oven is provided with a keypad 302, which includes numerical keys indicating temperature values increasing stepwise. Therefore, a user can easily set a temperature of the upper heater 220 and lower heaters 226 and 228 by pushing a numerical key indicating a desired temperature.

The input unit 204 is provided with not only a keypad 302, a start button 304 and a stop button 306, but also buttons (i.e., mode selection keys 308) to allow a user to select a cooking mode. The numerical keys comprising the keypad 302 are allocated with numeric characters "0"–"9" and numeric characters indicating 10 different temperature values increasing stepwise in a range of, for example, 40° C. to 220° C. The 10 numerical keys indicating the numeric characters "1 ", "2", "3", . . . , "8", "9" and "0" are allocated with corresponding temperature values of, for example "40° C.", "100° C.", . . . , "190° C.", "205° C." and "220° C.", respectively. Further, a user can easily set a desired temperature of the upper heater 220 and lower heaters 226 and 228 by pushing one of the numerical keys indicating the desired temperature from among the 10 numerical keys.

In an operation of the microwave oven, when a user selects the cooking mode using the upper heater 220 and lower heaters 226 and 228 as in a baking or a broiling mode, the desired cooking temperature is set by pushing one of the numerical keys indicating the desired cooking temperature. More specifically, when a baking mode key of the mode selection keys 308 is selected to bake bread, the input unit 302 is automatically switched to a mode of setting the desired temperature, and one of the numerical keys in the keypad 302, indicating the desired temperature, is pushed by the user. The set temperature is displayed on a display unit 224. After the desired temperature is set, the input unit 204 is automatically switched to a mode of setting a cooking time. Thereafter, the user can set a desired cooking time by selecting numerical keys corresponding to the desired cooking time from among the numerical keys of "0"–"9" of the keypad 302. The set cooking time is displayed on the display unit 224. After the desired cooking temperature and time are set, a cooking operation is started in the baking mode by pushing the start button 304.

Figure 4:
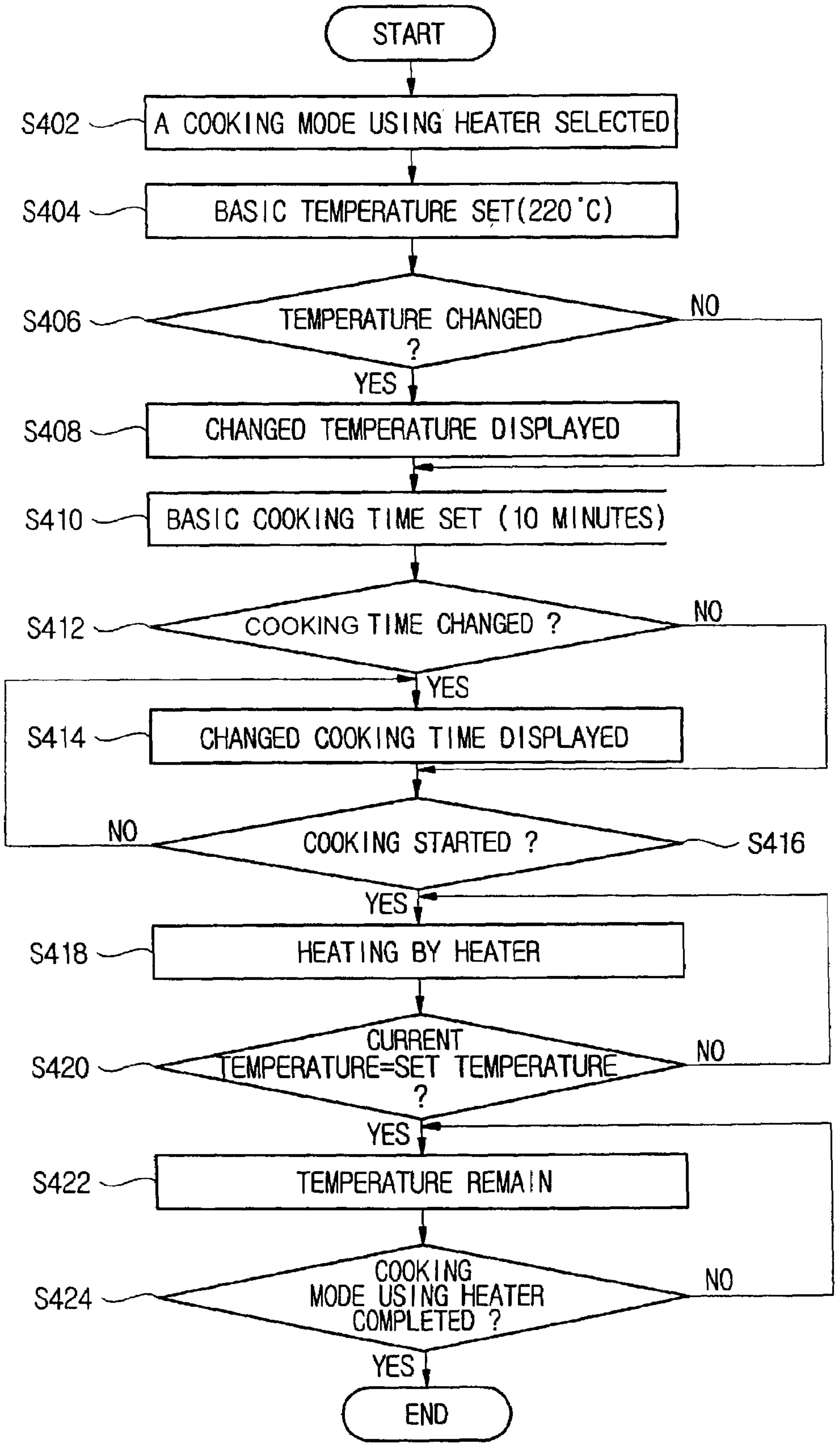
FIG. 4 is a flow chart showing a method of controlling the microwave oven according to the embodiment of the present invention.

FIG. 4 is a flow chart showing a method of controlling the microwave oven according to the embodiment of the present invention. As shown in FIG. 4, when a mode using the heaters is selected, as in a baking mode or a broiling mode at operation S402, a temperature of 220° C. is set as a basic temperature at operation S404. The control unit 202 determines whether a user changes a cooking temperature at operation S406. When the user changes the cooking temperature, the changed cooking temperature is displayed on the display unit 224 at operation S408. Thereafter, the user sets the changed cooking temperature by pushing numerical keys corresponding to the changed cooking temperature, as described in reference to FIG. 3. If a certain time period (e.g., 10 seconds) is elapsed after the cooking mode using the heaters is selected, the temperature of 220° C. as the basic temperature is decided as a final set temperature, considering that the user does not intend to change the cooking temperature. After setting of the cooking temperature is completed, the process is switched to the mode of setting a cooking time, in which a basic cooking time is set to a time of 10 seconds S410. In this operation, the control unit 202 also determines whether the user changes the cooking time at operation S412. When the user changes the cooking time, the changed cooking time is displayed on the display unit 224 at operation S414.

The control unit 202 determines whether the start button 304 is pushed at operation S416. If the start button 304 is pushed, a temperature of the cooking chamber 20 is increased to the set cooking temperature by heating of the upper heater 220 and the lower heaters 226 and 228 at operation S418. Thereafter, the control unit 202 determines whether a current temperature of the cooking chamber 20 reaches the set cooking temperature at operation S420. If the current temperature of the cooking chamber reaches the set cooking temperature, the current temperature remains at the set temperature at operation S422. If the current temperature of the cooking chamber 20 does not reach the set cooking temperature, the upper heater 220 and the lower heaters 226 and 228 are further operated to increase the temperature. When the cooking mode using the upper heater 220 and the lower heaters 226 and 228 is completed while the set temperature remains, the heating by the upper heater 220 and the lower heaters 226 and 228 is stopped and the cooking mode is concluded at operation S424.

FIG. 5 is a microwave oven according to the embodiment of the present invention.

As shown in FIG. 5, the microwave oven comprises a machine room 10 and a cooking chamber 20. Several electrical devices, including a magnetron 11, are installed in the machine room 10 so as to generate high-frequency electromagnetic waves. The housing of the microwave oven is partitioned into the machine room 10 and the cooking chamber 20 which defines a space to cook the food. High-frequency electromagnetic waves generated by the magnetron 210 are transmitted to the cooking chamber 20 to cook the food, which is placed in the cooking chamber 20.

The cooking chamber 20 is defined by a rear wall 21, a left sidewall 22 and a right sidewall 23, an upper wall 24 and a bottom wall 25, and is open at a front of the cooking chamber 20. A door (not shown) is mounted to the open front so as to selectively open the cooking chamber 20. A tray 216 and a tray motor 214 are installed at positions above and under the bottom wall 25 of the cooking chamber 20, respectively. The food to be cooked is placed on the tray 216.

An upper heater 220 is installed at a position adjacent to the upper wall 24 of the cooking chamber 20 and emits heat of a high temperature downwardly in the cooking chamber 20. One or more middle heaters 226 and 228 are installed between the upper heater 220 and the tray 216 and emit heat of a high temperature upwardly and downwardly in the cooking chamber 20. That is, the upper heater 220 is positioned at an upper portion in the cooking chamber 20, and the one or more middle heaters 226 and 228 are positioned between the upper heater 220 and the tray 216. Thus, heat is transmitted to upper and lower parts of the food placed between the upper heater 220 and the one or more middle heaters 226 and 228. Further, heat is transmitted to the upper part of the food placed between the one or more middle heaters 226 and 228 and the tray 216.

Each of the one or more middle heaters 226 or 228 is fixed to one rotating member of a pair of rotating members **226*a* and 228*a* and each of the pair of rotating members 226*a* and 228*a* is rotatably installed on the rear wall 21 of the cooking chamber 20. As the rotating members 226*a* and 228*a* are rotated by a drive unit (not shown) which is installed outside the cooking chamber 20, the one or more middle heaters 226 and 228 may be rotated between vertical closed positions, respectively, for which the one or more heaters 226 and 228 face the side walls and horizontal open positions, respectively, for which the one or more heaters 226 and 228 are directed to a center of the cooking chamber 20**.

A pair of upper supports 34 is provided between the upper heater 220 and the one or more middle heaters 226 and 228 so as to horizontally and inwardly protrude from the left and right sidewalls 22 and 23, respectively. The pair of upper supports 34 supports a first food holding member 50 or a second food holding member 60 so as to slide in and out of the cooking chamber 20. In the similar manner as the upper supports 34, a pair of lower supports 35 is provided between the one or more middle heaters 226 and 228 and the tray 216 so as to horizontally and inwardly protrude from the left and right sidewalls 22 and 23, respectively. The pair of lower supports 35 support the first food holding member 50 or the second food holding member 60 so as to allow the first food holding member 50 or the second food holding member 60 to slide in and out of the cooking chamber 20.

The first and second food holding members 50 and 60 are removably seated on the upper and lower supports 34 and 35, thus allowing one or more food items to be cooked in the cooking chamber 20. A projection 36 is provided on a front portion of the left sidewall of the cooking chamber 20 at a position above one of the upper supports 34 and is spaced apart from the one upper support 34 by a predetermined interval. A vertical step 37 is provided at a position between the upper and lower supports 34 and 35 so as to be positioned at the front portion of the left sidewall 22, and prevents the first food holding member 50 or second food holding member 60 from interfering with the one or more middle heaters 226 and 228 which are positioned between the upper and lower supports 34 and 35.

As described above, a cooking apparatus having heaters with an input unit including numerical keys allocated with various cooking temperatures is provided. Accordingly, a user can easily perform a setting operation through a manipulation of the numerical keys.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cooking apparatus comprising:

a cooking chamber defined in the cooking apparatus;

a heater provided in the cooking chamber;

two or more buttons respectively, representing different cooking temperatures;

wherein a temperature of the cooking chamber is set by pushing one of the two or more buttons; and wherein the buttons comprise a keypad including numerical keys allocated with preset numeric characters, each of the numerical keys of the keypad representing a preset cooking temperature.

2. The cooking apparatus as set forth in claim 1 wherein one of a plurality of cooking modes is selected depending on a kind of food, and each of the cooking temperatures represented by one of the two or more buttons corresponds to each of the cooking modes.

3. The cooking apparatus as set forth in claim 1, wherein the numerical keys indicate temperature values which increase stepwise.

4. The cooking apparatus as set forth in claim 1 further comprising:

mode selection keys to select a cooking mode by manipulation of one or more of the mode selection keys.

5. The cooking apparatus as set forth in claim 4, wherein the buttons comprise a keypad including numerical keys that indicate temperature values corresponding to the cooking mode selected.

6. The cooking apparatus as set forth in claim 1, further comprising:

a display unit displaying a temperature selected after a cooking mode and desired cooking temperature are selected.

7. The cooking apparatus as set forth in claim 5, wherein after the display unit displays a temperature selected, a set cooking time is displayed.

8. A cooking apparatus having a cooking chamber therein to heat food, comprising:

two or more heaters provided in the cooking chamber to heat the cooking chamber wherein each heater can have different cooking temperatures; and two or more selectors representing the different cooking temperatures wherein the temperature of the cooking chamber is set by manipulating one of the selectors wherein the selectors comprise a keypad including numerical keys allocated with preset numeric characters, each of the numerical keys of the keypad representing a preset cooking temperature.

9. A cooking apparatus having a cooking chamber therein, comprising:

two or more heaters provided in the cooking chamber to heat the cooking chamber wherein each heater can have different cooking temperatures; and two or more dual mode buttons, representing the different cooking temperatures depending on a cooking mode and numerical keys to numerically select the cooking temperature by manipulating two or more of the dual mode buttons to set the cooking temperatures.

10. A method of controlling a cooking apparatus having a cooking chamber therein to heat food using two or more heaters, comprising:

storing different cooking temperatures in a control unit;

connecting an input unit to the control unit wherein the input unit includes two or more selectors wherein each selector can be used to set a temperature of each of the heaters;

manipulating at least one of the two or more selectors to set the cooking chamber to a desired temperature for one of the two or more heaters wherein the selectors comprise a keypad including numerical keys allocated with preset numeric characters, each of the numerical keys of the keypad representing a preset cooking temperature;

optionally manipulating at least one of the remaining selectors to set the cooking chamber to a desired temperature for another heater; and heating the cooking chamber using the heaters to heat the food.

11. A method of controlling a cooking apparatus having a cooking chamber therein to heat food using two or more heaters, comprising:

selecting a cooking mode using a set of buttons that corresponds to each of the cooking modes;

setting a temperature of at least one of the heaters of the cooking chamber to a basic temperature by selecting mode selection keys wherein the selection keys automatically select the temperature;

optionally manipulating at least one of the remaining mode selection keys to set the cooking chamber to a basic temperature for another heater;

determining if the basic temperature should be retained as a final set temperature wherein the basic temperature can be changed by manipulating numerical keys corresponding to the desired cooking temperature if a preset period has not elapsed after the cooking mode is selected or alternatively retaining the basic temperature as a final set temperature; and displaying on a display unit the final set temperature of the cooking chamber.

12. The method of controlling a cooking apparatus according to claim 12, further comprising:

inputting an initial cooking time for the food to cook in the cooking chamber;

setting a desired cooking time by manipulating numerical keys corresponding to the desired cooking time;

determining if the desired cooking time of the cooking chamber is different from the inputted initial cooking time for the food to cook in the cooking chamber; and displaying on the display unit the inputted initial cooking time for the food to cook in the cooking chamber.

13. A method of controlling a cooking apparatus having a cooking chamber therein, comprising:

setting a temperature in the cooking chamber by a set of dual mode buttons wherein each dual mode button can represent different cooking temperatures depending on a cooking mode and represent numerical keys to numerically select a cooking temperature by consecutively manipulating two or more of the dual mode buttons.

* * * * *